United States Patent [19]

Akuta

[11] Patent Number: 5,411,214
[45] Date of Patent: May 2, 1995

[54] METHOD FOR DISPOSING OF ENAMELED WIRE SCRAPS

[75] Inventor: Yasuo Akuta, Ichihara, Japan

[73] Assignee: The Furukawa Electric Co., Ltd., Tokyo, Japan

[21] Appl. No.: 114,667

[22] Filed: Aug. 31, 1993

[30] Foreign Application Priority Data

Aug. 31, 1992 [JP] Japan .................................. 4-257480
May 11, 1993 [JP] Japan .................................. 5-132954

[51] Int. Cl.⁶ ...................... B02C 23/10; B02C 23/18
[52] U.S. Cl. ..................................... 241/19; 241/24; 241/27; 29/403.3
[58] Field of Search ........................... 29/403.1, 403.3; 241/14, 20, 24, 27, 19

[56] References Cited

U.S. PATENT DOCUMENTS

| | | | |
|---|---|---|---|
| 2,879,005 | 3/1959 | Jarvis | 241/14 |
| 3,074,653 | 1/1963 | Schorsch | 241/14 |
| 3,670,969 | 6/1972 | Terada | 29/403.3 |
| 3,705,694 | 12/1972 | Slocum | 241/14 |
| 3,749,322 | 7/1973 | Reynolds | 29/403.3 X |
| 4,022,638 | 5/1977 | Weet | 241/24 X |
| 4,319,394 | 3/1982 | Vercruysse, Jr. | 29/403.3 X |
| 4,362,276 | 12/1982 | Morey | 241/24 |
| 4,940,187 | 7/1990 | Lee . | |
| 4,964,577 | 10/1990 | Kopp | 241/24 |

*Primary Examiner*—Timothy V. Eley
*Attorney, Agent, or Firm*—John P. White

[57] ABSTRACT

The present invention provides a method for disposing of enameled wire scraps having the steps of cutting the enameled wire scrap consisting of a metal wire and an enamel covering while stirring to obtain a cut-piece and to peel off the enamel covering from the metal wire selecting the cut-piece having a length equal to or less than a predetermined value from others, and separating the enamel covering from the selected cut-piece. As a result, the enamel covering can be removed from the enameled wire scrap with high efficiency and hence at a low cost, without generating a waste gas or the like.

17 Claims, 2 Drawing Sheets

METHOD FOR DISPOSING OF ENAMELED WIRE SCRAPS

BACKGROUND OF THE INVENTION

1. Field of the Invention

The present invention relates to a method for disposing of enameled wire scraps. More particularly, the present invention is concerned with a method for disposing of enameled wire scraps without causing environmental pollution such as air pollution and chemical pollution.

2. Description of the Related Art

An enameled wire is an insulating wire obtained by repeating a process in which a heat-dried type paint is applied onto the surface of a wire formed of copper or aluminum, and then baked. The scraps of the enameled wire are compression-molded into a compressed block of an appropriate size. The block is melted in a furnace as it is, thereby removing the enamel covering recovering the metal.

However, when the scrap block is heated to melt without prior treatment, the enamel covering generates a waste gas by heating to cause the air pollution. Even when the scrap block is heated at relatively low temperature to bake off the enamel covering alone, prior to melting in the furnace, the waste gas generated from the enamel covering does not decrease. Therefore, in order to remove the enamel covering from the wire scraps by use of a furnace or an incinerator, a dust collector is required to remove a good deal of the waste gas. This, increases the cost of recovering the metal since the dust collector is expensive.

There is another way to remove the enamel covering by dipping enameled wire scraps in a chemical agent to dissolve the enamel covering. However, this method may give rise to air pollution due to vaporization of the chemical agent. Further, this method has a drawback. Only a small amount of enameled wire scraps can be treated before the chemical agent's activity deteriorates. Furthermore, the chemical agent is expensive raising cost of recovering the metal.

SUMMARY OF THE INVENTION

The present invention has been made based on the background described above. An object of the present invention is to provide a method for disposing of enameled wire scraps in which an enamel covering can be efficiently removed from the enameled wire scrap at a low cost without generating a waste gas, etc.

This object can be attained by the method for disposing of the enameled wire scraps, which comprises the following steps:

cutting the enameled wire scrap consisting of a metal wire and an enamel covering while stirring to obtain a cut-piece and to peel off the enamel covering from the metal wire;

selecting the cut-piece having a length equal to or less than a predetermined value from others; and separating the enamel covering from the selected cut-piece.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
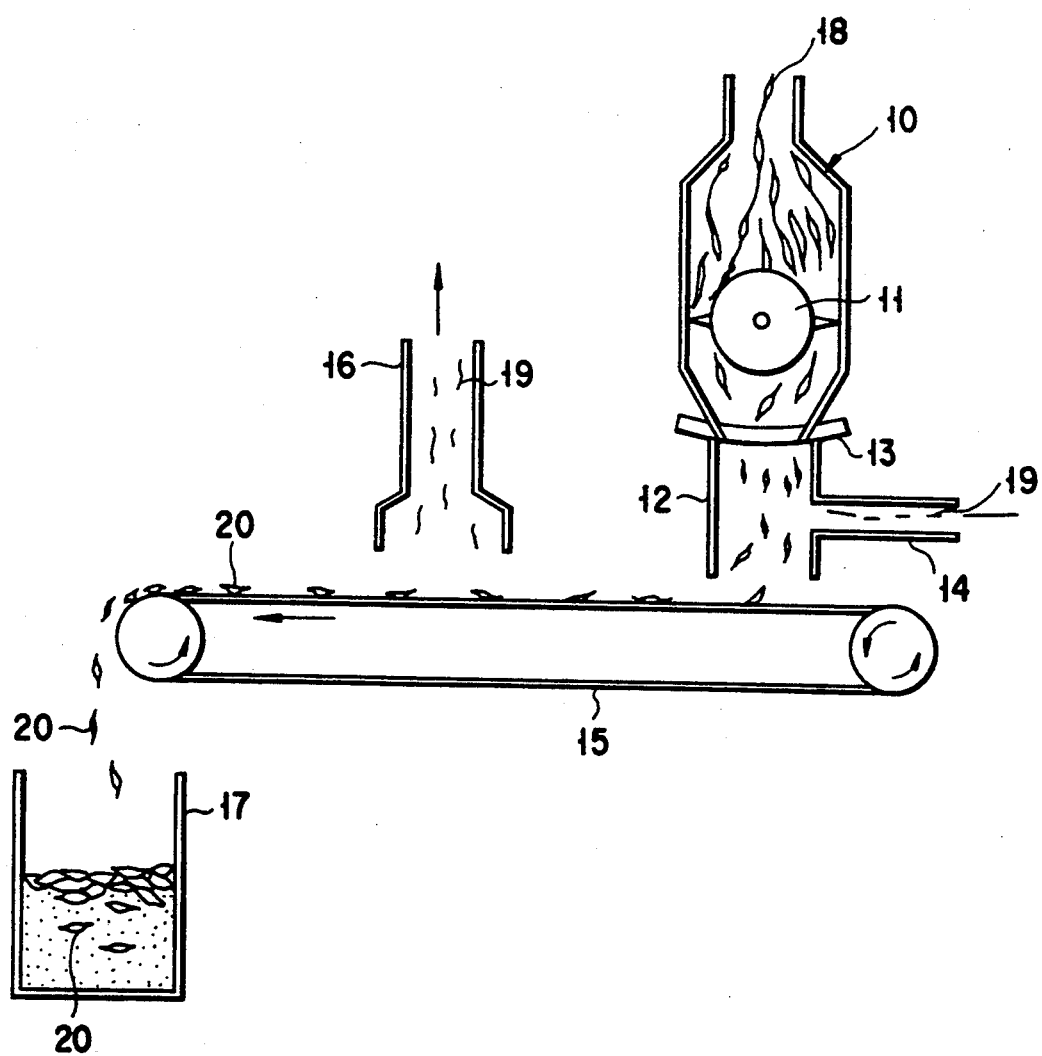
FIG. 1 is a schematic view of continuous disposal apparatus of the enameled wire scrap used in the method of the present invention.

In the present invention, a commonly used grinder, a shaft with a cutter, for example, can be employed to cut enameled wire scraps into a cut-piece and to stir the cut-piece. Alternatively, a grinder having a shearing-type cutter can be used. When using the latter 10 type of a grinder, an interval between adjacent cutter blades should be adjusted to 20 to 50% of the diameter of the enameled wire scrap, thereby to facilitate making scratches on the surface of the enameled wire scrap. The cutting and stirring may be performed simultaneously, in a sequential batch process, or in a continuous process by the above-mentioned grinder. In the batch process, a reciprocative cutter can be used. In the specification, a cut-piece means a substance obtained from an enameled wire scrap. Since the cut-piece obtained by cutting the enameled wire scrap has scratches on the enamel covering thereof, the enamel covering is peeled off readily from the metal wire of the cut-piece equal to the predetermined length or less by stirring. Therefore, not only metal wires and enamel covering before peeling off equal to the predetermined length or less, but also enameled wire-scrap more than the predetermined length are included in the cut-piece.

To separate the peeled-off enamel covering from the metal wire, can be used a specific gravity separation method such as a in-liquid separation method, a suction method; a centrifugation method, or an electrostatic separating method. An in-liquid separation method is based on a physical principle that gravity is proportional to mass. In this method, a cut-piece is immersed to a solvent such as water to allow an enamel covering alone, owing to its low specific gravity, to float in the solvent, thereby separating the enamel covering from the metal wire. The solvent employed in this method generally has a specific gravity higher than that of the enamel covering and lower than that of the metal wire. However, a solvent with a lower specific gravity than the enamel covering can also be used. In this case, since the heavy substance settles faster, the metal wire, enamel covering, and the solvent are layered in that order from the bottom. A suction method is a method for sucking an enamel covering by a suction pump. In a centrifugation method utilizes centrifugal force instead of gravity. Since the centrifugal force is also proportional to mass, this method is based on the same physical principle as the above. In this method, a cut-piece is immersed to a solvent such as water, which is transferred to a centrifuge tube, and subsequently spun in a rotor. As a result, several layers are formed in the order of high to low specific gravity from the bottom of the tube.

In an electrostatic separation method, an enamel covering is separated by use of coulomb's force which electrostatically attracts the enamel covering.

Another method can be applied in which enamel covering is blown away by a gas-blow such as air-blow. Above all, the specific gravity separation method is preferable since it can be performed at a low cost.

According to the present invention, the predetermined length of an enameled wire scrap cut-piece is preferably 10 times the diameter of the enameled wire scrap. Any scrap cut-piece having a length exceeding 10 times the diameter of the scrap is continued to be cut into pieces having a length equal to or less than 10 times its diameter. If the length of the cut-piece exceeds 10 times the diameter of the enameled wire scrap, the enamel covering would fail to peel off from a metal wire. Since more scratches are formed on the enamel covering of the cut-piece as the cut-piece is repeatedly cut, peeling-off of the enamel covering is facilitated. Hence, the process of cutting the enameled wire scrap in the predetermined length helps to peel off the enamel covering from the metal wire, with the result that a metal will be recovered more efficiently.

According to the present invention, in order to select a desired cut-piece, so called a screen, for example, a flat plate with a plurality of holes having a predetermined inner diameter can be used. By placing the screen below the cutter, the cut-piece of a desired length (hereinafter, desired cut-piece) can be selected from the cut-piece. Since the holes of the screen have an inner diameter 10 times or less the diameter of the enameled wire scrap, only a desired cut-piece equal to the predetermined length or less can be selected, with the result that the metal recovery will be improved. If the holes are elliptical, their longer diameter must be 10 times or less the diameter of the wire scrap. If they are rectangular, the diagonal must be 10 times or less the diameter of the wire scrap.

Hereinbelow, Examples of the present invention will be described in detail with reference to drawings.

EXAMPLE 1

FIG. 1 shows an enameled wire scrap continuous disposal apparatus used in the method of the present invention. Symbol 10 in FIG. 1 shows a vertical grinder which cuts an enameled wire scrap into pieces having a predetermined length. A rotating blade 11 is disposed in the vertical grinder 10. The interval between adjacent blades of the rotating blade 11 is 0.2 mm. The interval is equivalent to 40% of the diameter, i.e., 0.5 mm of a copper enameled wire scrap 18 to be treated.

Below the vertical grinder 10, connected is a cylindrical guide 12 which guides cut-pieces to a conveyer 15. The vertical grinder 10 is communicated with the cylindrical guide 12 via a screen 13 which is used to select a desired cut-piece.

As a screen material, SUS or a rolling steel for general structural purpose can be used. The inner diameter of the hole of the screen 13 is defines as 5 mm which is equivalent to 10 times the diameter of the copper enameled wire scrap 18.

A side wall of the cylindrical guide 12 is equipped with a sucking pipe 14, in which a first-stage removal of peeled-off enamel covering (hereinafter, enamel covering leaf) from the desired cut-pieces is performed. Beneath the cylindrical guide 12, positioned is the conveyor 15, on which the desired cut-pieces completed the first stage removal of the enamel covering leaf are transported. Beside the vertical grinder 10 and above the conveyor 15, positioned is a draft 16, in which a second stage removal of the enamel covering leaf from the desired cut-pieces is performed. Below an end of the conveyor 15, positioned is a container 17 to collect metal-pieces completed the second stage removal of the enamel covering leaf.

Using the enameled wire scrap continuous disposal apparatus having the above construction, a copper enameled wire scrap of 0.5 mm in diameter was treated as follows:

loading the copper enameled wire scrap 18 into the grinder 10 of the enameled wire scrap disposal apparatus from the upper open portion in a continuous manner;

cutting the copper enameled wire scrap 18 into a cut-piece and making scratches on the enamel covering thereof in the grinder 10;

peeling off the enamel covering starting from the scratch including stirring which causes reciprocal impingement;

selecting a cut-piece having a length equal to or less 10 times the diameter of the copper enameled wire scrap 18 through the screen 13;

dropping the desired cut-piece on the conveyor 15 through the cylindrical guide 12, in which the enamel covering leaf 19 was sucked out by the suction pipe 14, thereby completing the first-stage removal of the enamel covering leaf 19;

performing the second-stage removal of the enamel covering leaf 19 by the draft 16 while the first-stage removal completed desired cut-pieces were transporting on the conveyor 15;

transferring an enamel-off metal-piece 20 on the conveyor 15 to the container 17; and compressing the metal-piece 20 in a predetermined shape to obtain a scrap block.

On the other hand, a copper enameled wire scrap of 1.0 mm in diameter was treated by use of the enameled wire scrap continuous disposal apparatus having the same construction as in the above. An interval between adjacent rotating blades 11 was adjusted to 0.4 mm which was equivalent to 40% of the diameter of the copper enameled wire scrap 18. The inner diameter of the hole of the screen 13 was adjusted to 10 mm which was equivalent to 10 times the diameter of the copper enameled wire 18.

Comparative Embodiment 1

A scrap block was obtained in substantially the same procedure as in Example 1 except that use was made of screens with holes having inner diameters of 7 mm and 14 mm which were equal to 14 times the diameters; 0.5 and 1.0 mm of the copper enameled wire scraps.

Comparative Embodiment 2

The copper enameled wire scraps used in Example 1 were compressed as they were to obtained scrap blocks.

The amount of remaining enamel covering was measured with respect to thus obtained the copper enameled wire scrap blocks.

The amount of enamel covering was determined as follows. A sample is taken from the block. The weight of the sample is measured before the treatment. The sample is dissolved in nitric acid, the resultant solution is subjected to filtration to measure the weight of the remainder. The percentage of the weight of the remainder to that of the sample is calculated.

The scrap blocks were put into a furnace to melt and the generation of waste gas was observed. The amount of dust in the waste gas was determined by means of component analysis and by measuring a weight of the waste gas. The results are shown in Table 1.

TABLE 1

| Sample No | Diameter of an enameled wire (mm $\phi$) | Length of a cut-piece after grinding (mm) | Diameter of a hole in a screen (mm) | Remaining amount of an enamel covering (%) | Gas generation | Amount dust (g/Nm$^3$) |
| --- | --- | --- | --- | --- | --- | --- |
| Example | | | | | | |
| 1 | 0.5 | 3 | 5 | 0.2 | scarcely observed | 0.16 |
| 2 | 0.5 | 5 | 5 | 0.3 | scarcely observed | 0.18 |
| 3 | 1.0 | 5 | 10 | 0.25 | scarcely observed | 0.17 |
| 4 | 1.0 | 10 | 10 | 0.4 | scarcely observed | 0.19 |
| Comparative Example 1 | | | | | | |
| 5 | 0.5 | 7 | 7 | 1.3 | much | 3.7 |
| 6 | 1.0 | 14 | 14 | 1.6 | much | 4.2 |
| Comparative Example 2 | | | | | | |
| 7 | 0.5 | — | — | 2.0 | much | 5.7 |
| 8 | 1.0 | — | — | 2.5 | much | 6.2 |

As is apparent from Table 1, the amount of the remaining enamel covering are small in scrap blocks Nos. 1 to 4 obtained by the method of the present invention. As a result, a waste gas scarcely generated when a scrap block was melted in the furnace. The amount of dust in the waste gas was as low as less than the regulated value, 0.2 g/Nm$^3$. Compared to a conventional method, a larger amount (about 10 times as much as the conventional method) of enameled wire scraps was able to be treated in a short time.

In contrast, a waste gas accompanying a large amount of dust was intensively generated from scrap blocks Nos. 5 to 6 when melted in the furnace. This is caused by the remaining enamel covering which was not satisfactory peeled from the cut-piece since obtained cut-piece through the larger holes of a screen was long. On the other hand, the remaining enamel covering and dust in a waste gas were relatively high in the scrap blocks Nos. 7 and 8 obtained by a conventional method since they were melted in the furnace as they were.

Example 2

Figure 2A:
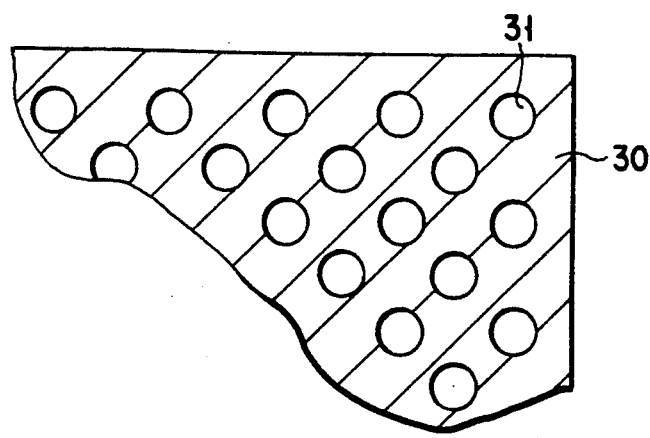
FIG. 2A is a plan view showing a screen of the continuous disposal apparatus of an enameled wire scrap shown in FIG. 1.
Figure 2B:
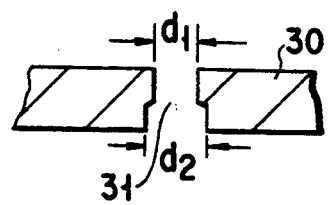
FIG. 2B is a cross sectional view of a hole portion of the screen shown in FIG. 2A.

An enamel-covering removal rate was examined with respect to copper enameled wire scraps having 1.0 mm in diameter after they were treated by various enameled wire continuous disposal apparatus with screens varying an inner diameter of a hole thereof. FIG. 2A is a plan view showing a hole 31 of a screen 30. FIG. 2B is a cross-sectional view of the hole 31. The screen 30 is a plate having 8 mm in thickness formed of SUS. Round circular holes 31 are formed in a space factor of approximately 30% in the screen 30. In FIG. 2B, $d_1$ is an inner diameter of the hole at the side of the screen, from which the cut-piece is going-in, and $d_2$ is an inner diameter of the hole at the other side of the screen, from which a cut-piece is going-out. To ensure that the hole is not blocked by the cut-pieces, $d_2$ is made larger than $d_1$. The removal rate of the enamel covering was determined as follows. Prior to treatment, the weight proportion of the enamel portion to the metal portion of an enameled wire scrap is measured. Assuming that a long enameled wire is uniform in structure along its length, several samples are randomly taken from the long enameled wire. After the samples are dissolved in nitric acid, the resultant solution is subjected to filtration to measure the weight of the metal portion, thereby determining the before-treatment average proportion (A) of the enamel portion to the metal portion.

Next, the weight of the samples after treatment is measured and then dissolved in nitric acid. After filtration, the weight of the metal portion is measured. As a result, the after-treatment average proportion (B) of the enamel portion to metal portion after treatment is determined. Assuming that there is no weight loss in the metal portion from the treatment, the removal rate of enamel covering is determined by the following equation:

Removal rate (%) = $B/A \times 100$

Figure 3:
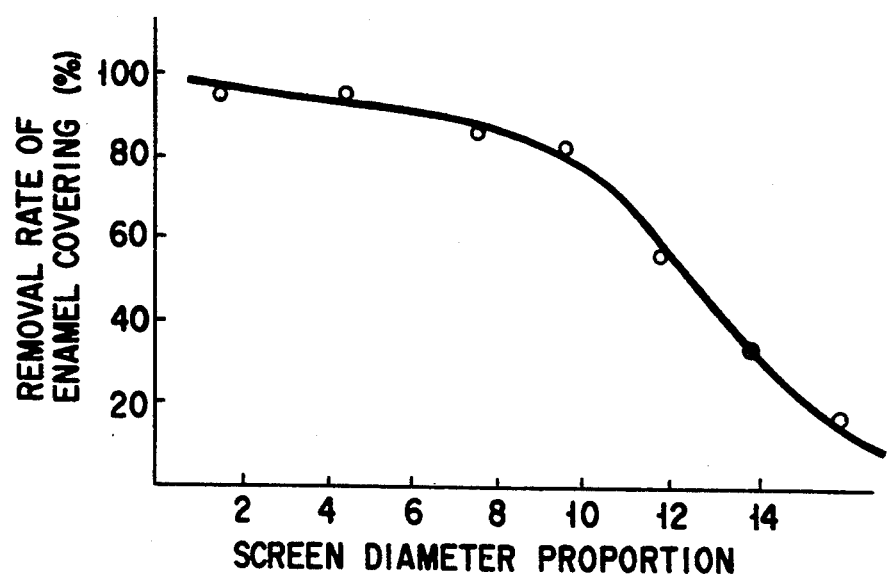
FIG. 3 is a graph showing the relationship between the removal rate of an enamel covering and the diameter of the hole of the screen placed in the continuous disposal apparatus of an enameled wire scrap used in the method of the present invention.

FIG. 3 is a graph between the screen diameter proportion (the inner diameter of a hole in the screen relative to the diameter of an enameled wire scrap) and the removal rate of the enamel covering. As is apparent from FIG. 3, the removal rate of the enamel covering is significantly reduced when the inner diameter of a hole in the screen exceeds 10 times the diameter of an enameled wire scrap.

In Examples of the present invention, copper enameled wire scraps were used, however, when an aluminum wire scrap and the like are used, the similar results can be obtained.

From the foregoing, since the method of the present invention comprises: the steps of cutting the enameled wire scrap consisting of a metal wire and an enamel covering while stirring to obtain a cut-piece and to peel the enamel covering from the metal wire, selecting the cut-piece having a length equal to or less than a predetermined value from others, and separating the enamel covering from the selected cut-piece, the enamel covering can be efficiently removed from the enameled wire scrap at a low cost without causing air pollution and chemical pollution, and a metal can be efficiently recovered.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method for disposing of an enameled wire scrap comprising the steps of:

cutting the enameled wire scrap consisting of a metal wire and an enamel covering while stirring the enameled wire scrap to obtain pieces and to peel off the enamel covering from the metal wire;

selecting from said pieces, pieces having a length equal to or less than a predetermined length, wherein said predetermined length is 10 times the diameter of the enameled wire scrap; and separating the enamel covering from said selected pieces.

2. The method according to claim 1, which further comprises a step of further cutting pieces having a length more than said predetermined length while stirring said pieces.

3. The method according to claim 1, wherein said step of separating the enamel covering from said selected pieces is performed by a method selected from the group consisting of a specific gravity separation method and an electrostatic separating method.

4. The method according to claim 3, wherein said specific gravity separation method is one selected from the group consisting of an in-liquid separation method, a suction method, and a centrifugation method.

5. The method according to claim 1, wherein said step of cutting while stirring is performed by a grinder having a cutter.

6. The method according to claim 5, wherein said cutter has blades arranged at intervals of 20 to 50% of the diameter of the enameled wire scrap.

7. The method according to claim 1, wherein said steps of cutting while stirring said enameled wire scrap and said step of selecting from said pieces are performed simultaneously.

8. The method according to claim 1, wherein said step of separating the enamel covering from said pieces is performed by using a flat plate having a plurality of holes.

9. The method according to claim 8, wherein said plurality of holes have a larger diameter at one side of said flat plate than at the other side thereof.

10. A method for disposing of an enameled wire scrap comprising the steps of:

cutting the enameled wire scrap consisting of a metal wire and an enamel covering into pieces;

peeling off the enamel covering from said pieces by stirring said pieces;

selecting from said pieces, pieces having a length equal to or less than a predetermined length, wherein said predetermined length is 10 times the diameter of the enameled wire scrap; and separating enamel covering from said selected pieces.

11. The method according to claim 10, which further comprises a step of further cutting pieces having a length more than said predetermined length while stirring said pieces.

12. The method according to claim 10, wherein said step of separating the enamel covering from said selected pieces is performed by a method selected from the group consisting of a specific gravity separation method and an electrostatic separating methods.

13. The method according to claim 12, wherein said specific gravity separation method is one selected from the group consisting of an in-liquid separation method, a suction method, and a centrifugation method.

14. The method according to claim 10, wherein said step of cutting is performed by a grinder having a cutter.

15. The method according to claim 14, wherein said cutter has blades arranged at intervals of 20 to 50% of the diameter of the enameled wire scrap.

16. The method according to claim 10, wherein said step of separating the enamel covering from said pieces is performed by using a flat plate having a plurality of holes.

17. The method according to claim 16, wherein said plurality of holes have a larger diameter at one said of said flat plate than at the other side thereof.

* * * * *